United States Patent
Kim et al.

(10) Patent No.: US 8,761,059 B2
(45) Date of Patent: Jun. 24, 2014

(54) METHOD FOR TRANSMITTING RELAY NODE-SPECIFIC CONTROL CHANNEL

(75) Inventors: Eun Sun Kim, Seoul (KR); Byeong Geol Cheon, Osan-si (KR); Ki Jun Kim, Uiwang-si (KR); Hak Seong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 13/002,056

(22) PCT Filed: Oct. 8, 2009

(86) PCT No.: PCT/KR2009/005749
§ 371 (c)(1),
(2), (4) Date: Dec. 30, 2010

(87) PCT Pub. No.: WO2010/041878
PCT Pub. Date: Apr. 15, 2010

(65) Prior Publication Data
US 2011/0096717 A1  Apr. 28, 2011

Related U.S. Application Data

(60) Provisional application No. 61/104,269, filed on Oct. 10, 2008.

(30) Foreign Application Priority Data

Dec. 19, 2008 (KR) .................. 10-2008-0130177

(51) Int. Cl.
*H04J 1/00* (2006.01)

(52) U.S. Cl.
USPC .......... 370/281; 370/315; 370/328; 370/329; 370/338; 370/535; 455/11.1

(58) Field of Classification Search
None
See application file for complete search history.

(56) References Cited

U.S. PATENT DOCUMENTS

| | | | |
|---|---|---|---|
| 8,311,026 B2* | 11/2012 | Kishiyama et al. | 370/344 |
| 2007/0155315 A1* | 7/2007 | Lee et al. | 455/11.1 |
| 2008/0159323 A1 | 7/2008 | Rinne et al. | |
| 2008/0232495 A1* | 9/2008 | Yu et al. | 375/260 |
| 2009/0097457 A1* | 4/2009 | Papasakellariou et al. | 370/336 |
| 2010/0008282 A1* | 1/2010 | Bhattad et al. | 370/312 |
| 2010/0008317 A1* | 1/2010 | Bhattad et al. | 370/329 |

\* cited by examiner

*Primary Examiner* — Ayaz Sheikh
*Assistant Examiner* — Hai-Chang Hsiung
(74) *Attorney, Agent, or Firm* — Morgan, Lewis & Bockius LLP

(57) ABSTRACT

A method for transmitting a downlink signal in a Frequency Division (FD) type base station is disclosed. The method includes transmitting a second downlink control channel specific to a second base station, when a first downlink control channel specific to a first base station is completely transmitted on a entire frequency band in a subframe, in a remaining region except a predetermined transmission region of a first downlink shared channel specific to the first base station in the subframe; and transmitting a second downlink shared channel including data of the RN in the remaining region, when the second downlink control channel is completely transmitted.

11 Claims, 14 Drawing Sheets

FIG. 3A
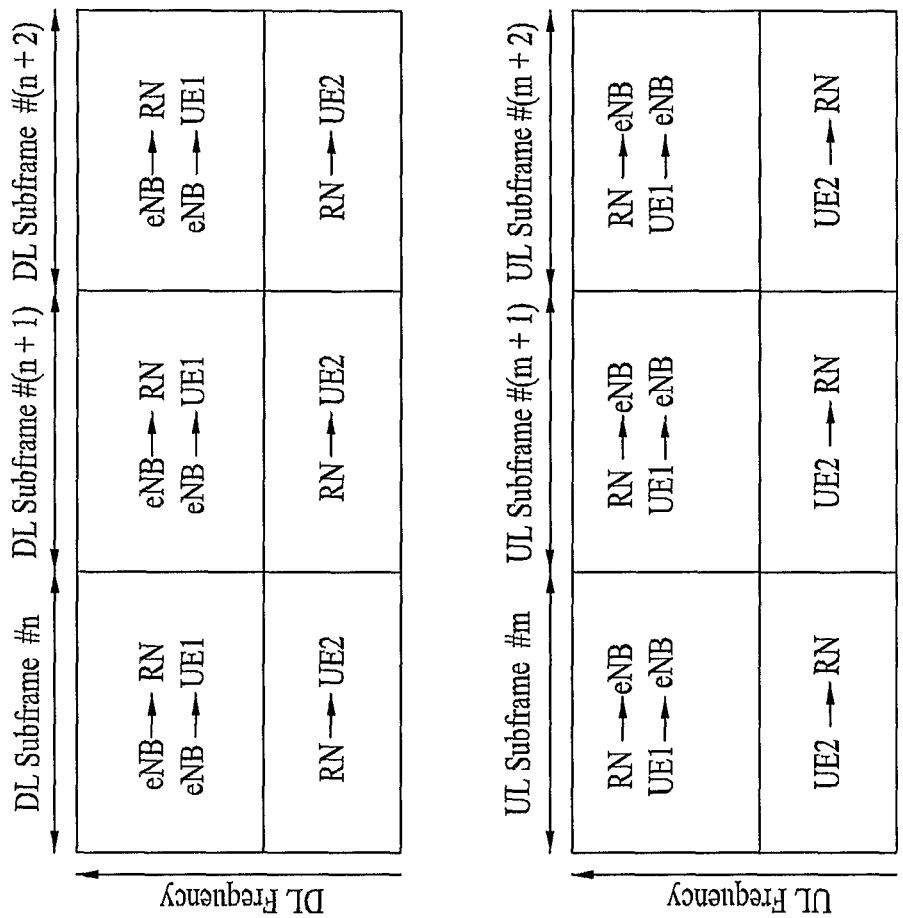
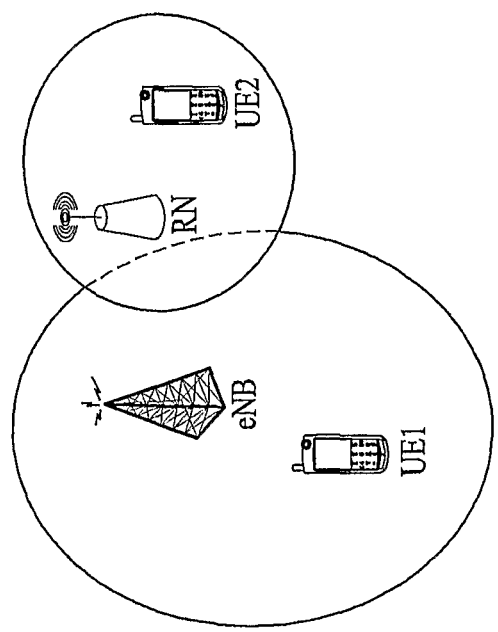

FIG. 3B
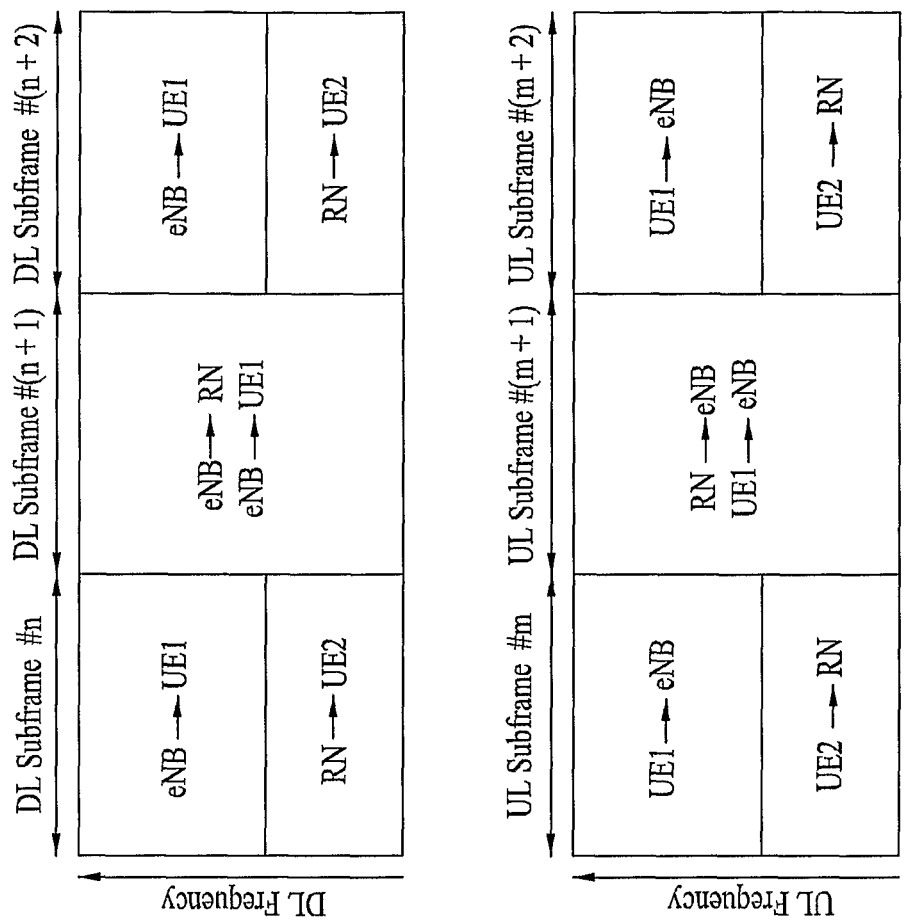
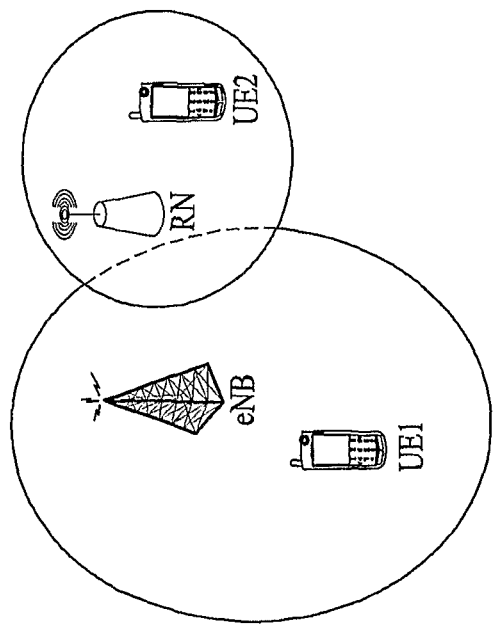

METHOD FOR TRANSMITTING RELAY NODE-SPECIFIC CONTROL CHANNEL

The present application is a national stage of PCT International Application No. PCT/KR2009/005749, filed Oct. 8, 2009, and claims the benefit of U.S. Provisional Application No. 61/104,269, filed Oct. 10, 2008. The present national stage application also claims the benefit of Korean Patent Application No. 10-2008-0130177, filed Dec. 19, 2008.

TECHNICAL FIELD

The present invention relates to a method for transmitting Relay Node (RN)-specific control information in a Long Term Evolution-Advanced (LTE-A) system evolved from a $3^{rd}$ Generation Partnership Project Long Term Evolution (3GPP LTE) system, and more particularly, to a method for transmitting RN-specific downlink control information.

BACKGROUND ART

FIG. 1 illustrates the structure of an LTE downlink frame.

Referring to FIG. 1, a basic frame structure is based on the LTE frame structure illustrated in FIG. 1. In the frame structure, a Physical Downlink Control Channel (PDCCH) area for carrying a control signal is time-division-multiplexed with a Physical Downlink Shared Channel (PDSCH) for carrying data in every subframe. When an enhanced Node B (eNB) transmits signals on a downlink, PDCCH transmission precedes PDSCH transmission. The PDCCH delivers information about the PDSCH. User Equipments (UEs) may be aware of the transmission areas and Modulation and Coding Scheme (MCS) levels of data directed to them only by decoding PDCCHs. The eNB transmits information about data for a plurality of UEs using their Identifiers (IDs) on the PDCCHs. Apparently, the UEs also decode the PDCCHs using their IDs.

In a cellular system where a single eNB controls a plurality of UEs, the eNB controls them by transmitting control information on a downlink control channel. Due to a limit on the number of PDCCHs that the eNB may transmit at one time instant, the eNB transmits control information to a UE on an arbitrary PDCCH at each time instant, rather than a different PDCCH is allocated beforehand to each UE. The UE identifies control information for it on the PDCCH by its ID. At each time instant, the UE decodes a plurality of PDCCHs (or a plurality of available PDCCH formats) and if there is any PDCCH directed for it, the UE receives control information on the PDCCH and operates based on the control information.

For the most part, RNs are used to increase user throughput and extend service coverage. As RNs are differently implemented depending on system types, application environments, and purposes, many modifications have been proposed in relation to RNs.

DISCLOSURE

Technical Problem

An object of the present invention devised to solve the problem lies on a method for transmitting an RN-specific control channel, for enabling reliable operations of an eNB and the RN, while ensuring compatibility with a legacy system in a new system.

Technical Solution

The object of the present invention can be achieved by providing a method for transmitting a downlink signal in a Frequency Division (FD) type Relay Node (RN), including transmitting a second downlink control channel specific to the RN, when a first downlink control channel specific to a base station is completely transmitted on a entire frequency band in a subframe, in a remaining area except a predetermined transmission area of a first downlink shared channel specific to the base station in the subframe and transmitting a second downlink shared channel including data of the RN in the remaining area, when the second downlink control channel is completely transmitted.

The first downlink control channel may include information about a second downlink shared channel to be transmitted after a predetermined number of subframes.

The first downlink control channel may be generated using an Identifier (ID) of the RN by the base station.

Information about a predetermined subframe shared between the base station and the RN in Frequency Division Multiplexing (FDM) or Time Division Multiplexing (TDM) may be transmitted in advance to a User Equipment (UE).

In another aspect of the present invention, provided herein is a method for transmitting a downlink signal in a Frequency Division (FD) type Relay Node (RN), including transmitting a second downlink control channel specific to the RN in a remaining area except a predetermined transmission area of a first downlink control channel specific to a base station, at the same timing when the first downlink control channel is transmitted and transmitting a second downlink shared channel including data of the RN in the remaining area, when a first downlink shared channel specific to the base station is transmitted.

The first downlink control channel may include information about a second downlink shared channel to be transmitted after a predetermined number of subframes.

The RN may share an interleaver with the base station and a predetermined area of the interleaver may be reserved for the RN.

The RN may share control channel elements with the base station and part of the control channel elements may be reserved for the RN.

In another aspect of the present invention, provided herein is a method for transmitting a downlink signal in a Frequency Division (FD) type Relay Node (RN), including transmitting a second downlink control channel specific to the RN in a remaining area except a first area for transmission of a first downlink control channel specific to a base station and transmitting a second downlink shared channel including data of the RN in a remaining area except a second area for transmission of a first downlink shared channel specific to the base station, when the second downlink control channel is completely transmitted, wherein the first area has the same bandwidth in every subframe.

The first downlink control channel may include information about a second downlink shared channel to be transmitted after a predetermined number of subframes.

In another aspect of the present invention, provided herein is a method for transmitting a downlink signal in a Frequency Division (FD) type Relay Node (RN), including transmitting a second downlink control channel specific to the RN in at least two areas except a predetermined area for transmission of a first downlink control channel specific to a base station and transmitting a second downlink shared channel including data of the RN in the at least two areas, when the second downlink control channel is completely transmitted.

The first downlink control channel may include information about a second downlink shared channel to be transmitted after a predetermined number of subframes.

In another aspect of the present invention, provided herein is a method for transmitting a downlink signal in a Time Division (TD) type Relay Node (RN), including transmitting a second downlink control channel specific to the RN at every predetermined subframe interval when a first downlink control channel specific to a base station is completely transmitted and transmitting a downlink shared channel including data of the RN when the second downlink control channel is completely transmitted.

A transmission region of the second downlink control channel may include a reference signal specific to the RN.

Information about a predetermined subframe shared between the base station and the RN in Time Division Multiplexing (TDM) may transmitted in advance to a User Equipment (UE).

In another aspect of the present invention, provided herein is a method for receiving a downlink signal from a Relay Node (RN) in a User Equipment (UE), including calculating an area of a first downlink control channel specific to a base station, the first downlink control channel being time-division-multiplexed or frequency-division-multiplexed with a second downlink control channel specific to the RN, receiving the second downlink control channel using the calculated area, when the first downlink control channel ends, and receiving a second downlink shared channel including data of the RN, when the second downlink control channel ends.

The calculating the area may include calculating the area of the first downlink control channel by blind detection.

The calculating the area may include receiving information about a symbol region where the first downlink control channel is transmitted in a subframe in which the base station and the RN transmit signals simultaneously.

The calculating the area may includes receiving, from the RN, information indicating a number of symbols on which the first downlink control channel is transmitted.

Advantageous Effects

According to exemplary embodiments of the present invention, when RNs are introduced to an LTE-A system, eNBs and the RNs can be operated reliably, ensuring compatibility with a legacy system.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIGS. 3A and 3B illustrate resource allocation schemes between an RN and an eNB, when the RN is a Frequency Division (FD)-RN.

BEST MODE

Figure 1:
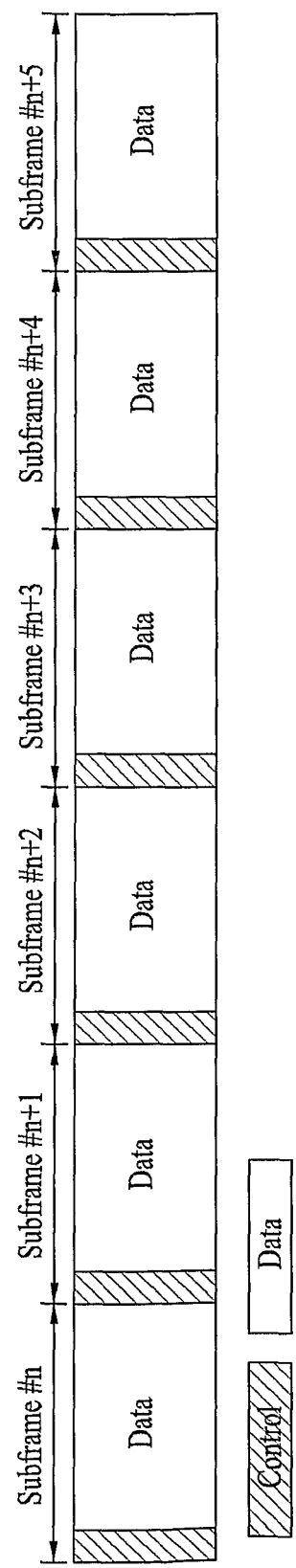
FIG. 1 illustrates the structure of an LTE downlink frame.

Hereinafter, the preferred embodiments of the present invention will be described with reference to the accompanying drawings. However, the following embodiments of the present invention may be variously modified and the range of the present invention is not limited to the following embodiments.

In a mobile communication system, when a base station (eNB) and a relay node (RN) coexist, the RN depends on the eNB. The RN may be largely divided into three RNs including an L1 (Layer 1) RN, an L2 (Layer 2) RN and an L3 (Layer 3) RN according to the functions thereof. The L1, L2 and L3 RNs are divided based on the functions of the RNs and communication layers thereof. The detailed accurate functions and layers are not defined yet, but the features and the properties of the RNs according to the functions and the characteristics which should be included in the respective RNs will be described as follows.

The L1 RN has only a physical layer and has a function for amplifying only the power of a signal and relaying the signal without performing a separate process and, more particularly, without decoding the received signal, when data is received from an eNB and is relayed to a User Equipment (UE). Even when a signal is transmitted in uplink, the signal received from a UE is relayed to the eNB without decoding the signal, and the transmission power thereof is properly adjusted (that is, amplified).

The L1 RN which is called a repeater is characterized in that a time delay hardly occurs or is very short in communication between the eNB and the UE using the RN since the RN does not decode the signal. In addition, since a special function is not added to the RN, when the UE communicates with the eNB via the RN, additional functions and signaling are not substantially necessary and thus the eNB and the UE can perform a transparent operation with respect to the RN. In contrast, the signal received by the RN actually includes an information signal and a noise signal. Therefore, when the RN simply amplifies the received signal and transmits the amplified signal, the noise signal is also amplified. Thus, the performance of the RN may be deteriorated.

Meanwhile, the L1 RN may be subdivided into an RN for relaying all received signals and a smart relay for selectively relaying the received signals. The smart RN relays a signal in a frequency-selective manner. In such an RN, a time delay of at least one Orthogonal Frequency Division Multiplexing (OFDM) symbol occurs. When the L1 RN is used in an LTE-A system, a device for adjusting power used for receiving and amplifying a signal and solving interference with another cell is necessary. For the smart RN, a downlink RS for measurement should be additionally defined because a channel quality information difference occurs due to the time delay.

The L2 RN has the functions of a physical layer and a link layer and, more particularly, a Medium Access Control (MAC) layer of the link layer, among layers defined in the Open Systems Interconnection 7 (OSI-7) layer. Since the L2 RN decodes a received signal and transmits the decoded signal, the L2 RN is called a Decode-and-Forward (DF) RN. Due to the DF operation, the noise signal is not amplified and transmitted when the RN relays the received signal, unlike Amplify-and-Forward (AF). Accordingly, since an Adaptive Modulation and Coding (AMC) scheme is applicable between the RN and the UE, the performance of the RN is improved.

However, a large time delay occurs when the eNB and the UE perform communication using the RN, due to the decoding operation of the RN. The L2 RN may have Hybrid Automatic Request (HARQ) and scheduling functions. This indicates that, when the RN decodes the received signal and relays the signal, the received signal is reconfigured and that a unique control channel of the RN is generated and transmitted.

Accordingly, a unique RS of the RN should be transmitted and countermeasures against the time delay should be provided. When the RN transmits the unique RS and the unique control channel, a method for operating the existing LTE UE is necessary. The L2 RN is characterized in that the RN decodes the received signal and transmits the decoded signal. The scheduling and HARQ functions may or may not be set according to cell configuration and system implementation. That is, the L2 RN may have an independent scheduler. Alternatively, the L2 RN may not have a scheduler and the eNB may have a scheduler.

The L3 RN is an access point most similar to the eNB. Since the L3 RN has a unique cell ID similar to the eNB, a UE may not substantially distinguish between the eNB and the L3 RN.

The case where the eNB and the RN transmit signals using the same carrier frequency will be described first. The RN receives a downlink signal from the eNB and transmits the signal to the UE in downlink, using the downlink frequency of the eNB. In addition, the RN receives an uplink signal from the UE and transmits the signal to the eNB in uplink, using the uplink frequency of the eNB. Such an RN is called an in-band RN.

A separate frequency used by the RN may be allocated separately from the downlink and uplink frequencies of the eNB. That is, the RN receives the downlink signal from the eNB using the downlink signal of the eNB, and transmits the signal to the UE using the separate downlink frequency of the RN. Similarly, the RN transmits the signal to the eNB using the uplink frequency of the eNB, and receives the signal from the UE using the separated uplink frequency of the RN. Such an RN is called an out-of-band RN.

Additionally, similar to the out-of-band RN, a separate link between the RN and the eNB may be defined. Since the link between the eNB and the RN is a wired link and the link between the RN and the UE and the link between the eNB and the UE are wireless links, wireless resources between the eNB and the RN need not be considered.

Hereinafter, when the link between the RN and the eNB is wireless, the in-band RN will be described.

In order to perform the respective functions of the RN and the eNB, time-frequency resources for signal transmission are necessary. The performance improvement of the system due to the introduction of the RN can be accomplished depending on in which manner the RN and the eNB share the resources and how efficiently the resources are used. Schemes for allocating the time-frequency resources to the RN and the eNB may be broadly divided into two schemes: a Time Division Multiplexing (TDM) scheme for differently setting the service times of the RN and the eNB so as to use the resources and a Frequency Division Multiplexing (FDM) scheme for enabling the RN and the eNB to simultaneously provide services in a time unit but differently setting frequency resources. The RN used in the former case is called a Time Division (TD) RN and the RN used in the latter case is called a Frequency Division (FD) RN.

Figure 2:
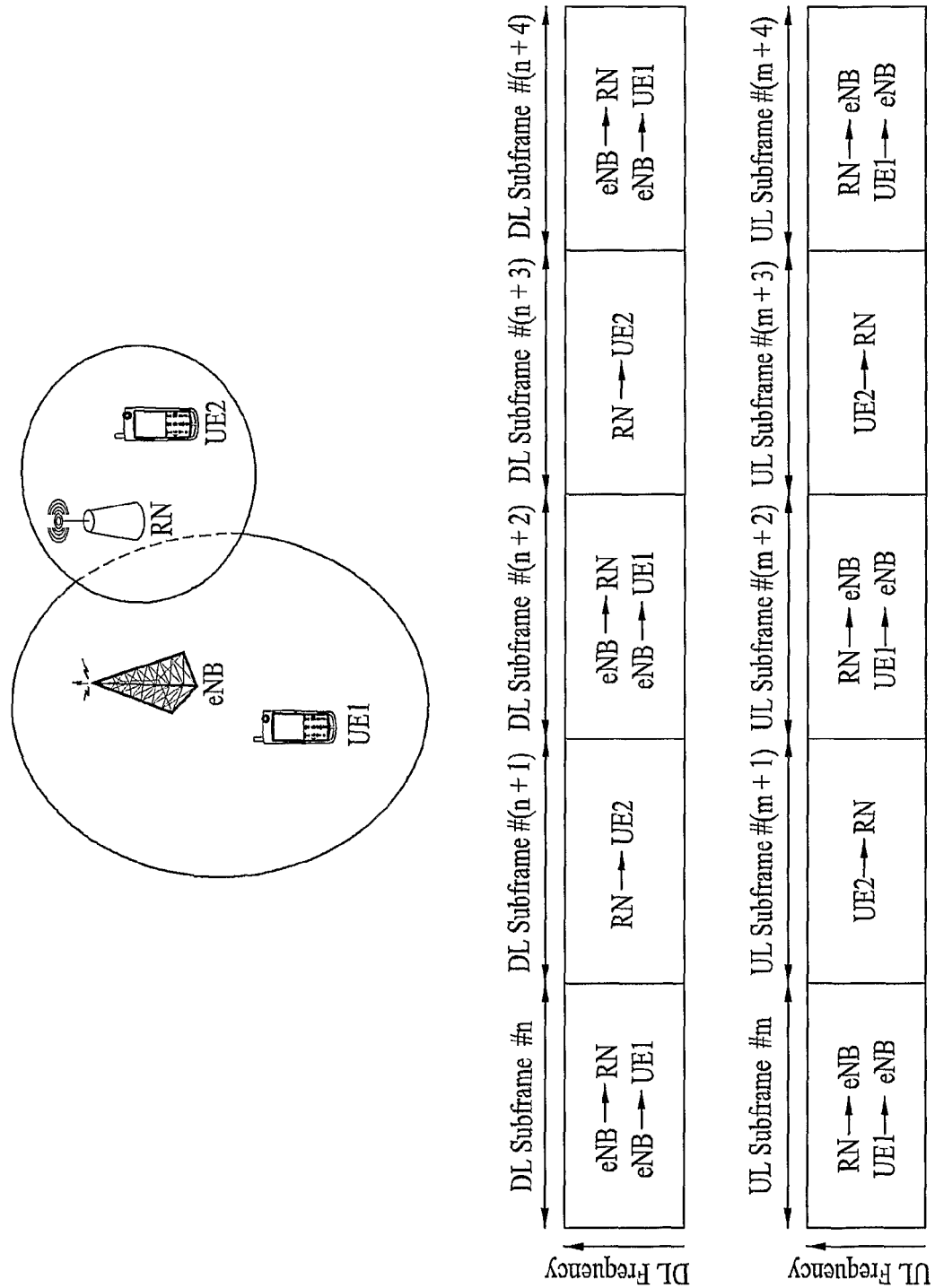
FIG. 2 illustrates a resource allocation scheme between an RN and an eNB, when the RN is a Time Division (TD)-RN.

Each of the systems shown in FIGS. 2, 3a and 3b includes an eNB and one RN depending thereon. UE1 denotes a UE (one-hop UE) for directly receiving a service from the eNB, and UE2 denotes a UE (multi-hop UE) for receiving a service from the RN. The UE which receives the service from the RN is represented by a two-hop UE, a three-hop UE or the like according to via how many nodes or access points the signal is transmitted between the eNB and the UE. FIGS. 2, 3A and 3B show the subframe structure from the point of view of the cell of the RN.

FIG. 2 is a view showing a resource allocation scheme between an RN and an eNB if the RN is a TD RN. In the L2 and smart L1 RN, a subframe in which the eNB transmits signals and a subframe in which the RN transmits signals as well as transmission and reception subframes of the RN are temporally divided.

Hereinafter, a description will be given based on downlink. Since signals are transmitted or received to or from the UE2 in order of the eNB, the RN, and the UE2, this UE is a two-hop UE. The eNB transmits the signals to the RN and the UE1 in any subframe and the RN transmits the signals to the UE2 in another subframe.

In the L2 RN, if the RN simultaneously performs transmission and reception using the same frequency, a phenomenon, wherein the transmitted signal flows into a reception antenna in an RF front-end, occurs and thus interference occurs in the received signal.

A scheme for dividing a subframe in which the RN receives the signals from the eNB and a subframe in which the RN transmits the signals to the UE2 are suitable. Since the eNB and the RN share a cell ID, the TDM scheme for dividing a subframe in which the eNB transmits the signals to the UE1 and a subframe in which the RN transmits the signals to the UE2 is suitable.

Even in the L3 RN, since the RN cannot simultaneously perform transmission and reception using the same frequency, the TDM scheme for temporally dividing the transmission and reception subframes of the RN is suitable. In this case, a scheme for dividing subframes in which the eNB and the RN transmit respective signals need not be considered.

Hereinafter, the TD RN will be described concentrating on the L2 RN. The description will be given without considering the division of subframes, in which the RN transmits and receives the signals. The RN does not transmit the signals in a subframe in which the eNB transmits the signals, and the eNB does not transmit the signals in a subframe in which the RN transmits the signals. When the subframes used by the RN and the eNB are divided, in order to support the LTE UE, for example, in order to transmit RSs and signals of PDCCH regions such as Multicast Broadcast Single Frequency Network (MBSFN) subframes, the eNB transmits the signals in a region allocated thereto. At this time, how a time when the eNB and the RN transmit the signals in downlink is distributed may be determined according to the amount of downlink data of the eNB and the RN. The distribution scheme may be semi-statically changed with a predetermined period or may be allocated by the system in advance and signaled. Similarly, even in uplink, the eNB and the RN transmit the uplink signals in different time regions (e.g., subframes).

FIGS. 3a and 3b are views showing a resource allocation scheme between an RN and an eNB if the RN is an FD RN.

In FIGS. 3a and 3b, in downlink, a specific band is divided into a band in which the eNB transmits signals in downlink and a band in which the RN transmits signals in downlink. In FIG. 3a, the eNB transmits the signals to the RN and the UE1 in a specific band and the RN transmits the signals to the UE2 in another band. In this scheme, the signals can be transmitted and received using different resource blocks at the same time with the same carrier frequency. In FIG. 3b, the transmission time and the reception time of the RN are divided and the eNB and the RN can simultaneously transmit the downlink signals in different bands. This is because the scheme in which the RN receives the signals from the eNB and, at the same time, transmits the signals to the UE2 in another band may cause interference in the transmitted and received signals of the RN, even when the transmission and reception bands are different from each other. At this time, how the subframes in which the eNB and the RN transmit the data using the FDM scheme may be determined by the amount of data transmitted by the RN in downlink. The distribution scheme may be semi-statically changed with a predetermined period or may be allocated by the system in advance and signaled.

Subbands used by the RN may be dynamically or statically allocated. However, since the UEs which should receive the service from the RN should know resources used for transmitting the signal by the RN, the static allocation scheme is more suitable.

When the RN transmits the signals using the above-described scheme, it is difficult to use the structure of the existing RS and control channel information without change. Accordingly, a separate scheme satisfying backward compatibility should be considered.

Hereinafter, a scheme for transmitting downlink RSs of an RN when an eNB and the RN coexist in a cell of a mobile communication system will be described.

In the mobile communication system, the RS may be broadly divided into two types of RSs according to purpose: a common-RS for acquiring channel information and an RS used for data demodulation. The former is used for enabling a UE to acquire downlink channel information. Accordingly, the common-RS should be transmitted in a wideband, and even a UE which does not receive downlink data in a specific subframe can receive and measure this RS. In addition, the common-RS is also used for measurement of handover or the like. The latter is an RS which is transmitted together with resources when the eNB transmits downlink data. The UE may receive this RS so as to perform channel estimation and demodulate the data. This RS should be transmitted in a region in which data is transmitted.

For an operation such as channel information acquisition and handover between an RN and a UE (hereinafter, referred to as an "R-UE") which receives a service from the RN, the RN should transmit downlink RSs. Further, if the RN transmits unique control information, the unique RS of the RN is necessary for enabling the R-UE to receive this control information.

Hereinafter, an embodiment of the present invention, in which the RN and the eNB simultaneously transmit the downlink signals in one subframe, will be described. In this case, the eNB and the RN transmit the downlink signals in one subframe using different time-frequency resource regions. That is, the above-described FD RN (in FIGS. 3a and 3b) is used.

First, if the RN is the L1 RN, the RN transmits the signal received from the eNB to the R-UE without change. There is a need for determining with how much power the RN relays the signals received from the eNB and how interference with another cell is resolved. In the smart RN, since the RN can receive the signals from the eNB and transmit the signals after a time delay of at least one symbol, the RN can transmit the signals to the R-UE after at least one subframe.

However, since timing when the RN receives the signals from the eNB and timing when the RN transmits the signals to the R-UE are different, the channel information of a previous subframe and the channel information of a subsequent subframe may be different from each other. Due to this problem, even in the L1 RN, the unique downlink RSs of the RN are necessary. At this time, the RN transmits its unique RS in a range which does not influence the existing system. In the current LTE system, the control information channel transmission region (PDCCH) and the data information channel transmission region (PDSCH) of the eNB are temporally divided. In particular, the PDCCH should be transmitted in the entire band. However, since the FD RN is the RN using resources in a manner in which the eNB and the RN use different frequency regions in one subframe, the RN should not transmit any unique signal of the RN in the PDCCH region so as not to influence the existing LTE UE.

Alternatively, the unique signal of the RN should be transmitted in the above region within the range which does not influence the existing LTE UE, without causing interruption. At the same time, in the data region allocated to the RN, it should also be determined whether the RSs of the eNB will be transmitted using the RS region allocated to the eNB. The RSs of the RN are necessary in the data region, in order to enable the R-UE to successfully receive the data transmitted by the RN. At this time, it is preferable that the RN transmit a dedicated RS. Accordingly, a plurality of dedicated RSs should be defined in one data region. This is because, in the LTE system, the dedicated RS is defined as a signal for a virtual antenna port, but the RN actually uses multiple antennas. In addition, the dedicated RSs need to be signaled using the plurality of virtual antenna ports.

Second, if the RN is the L2 RN, the RN transmits its unique RS, generates its unique PDCCH of the signals received from the eNB in consideration of the channel status between the RN and the R-UE, the amount of allocated resources, the amount of data to be transmitted and the like, and transmits the PDCCH and the PDSCH to the R-UE in a predetermined region. In this case, the RN should transmit the PDCCH in the entire band of a specific band allocated to the RN and should not damage the PDCCH transmission structure or the RS structure of the eNB.

At the same time, it should be determined whether the RS of the eNB will be transmitted in the data region allocated to the RN. Accordingly, the RS transmission structure of the RN is determined.

Since the L3 RN may have a unique cell ID, signals may be transmitted in the same band as the eNB. However, even in the L3 RN, the eNB and the RN may transmit the signals in a frequency division scheme if necessary, for an operation such as Inter Cell Interference Coordination (ICIC).

At the same time, it should be determined whether the RS of the eNB will be transmitted in the data region allocated to the RN. Accordingly, the RS transmission structure of the RN is determined.

Figure 4:
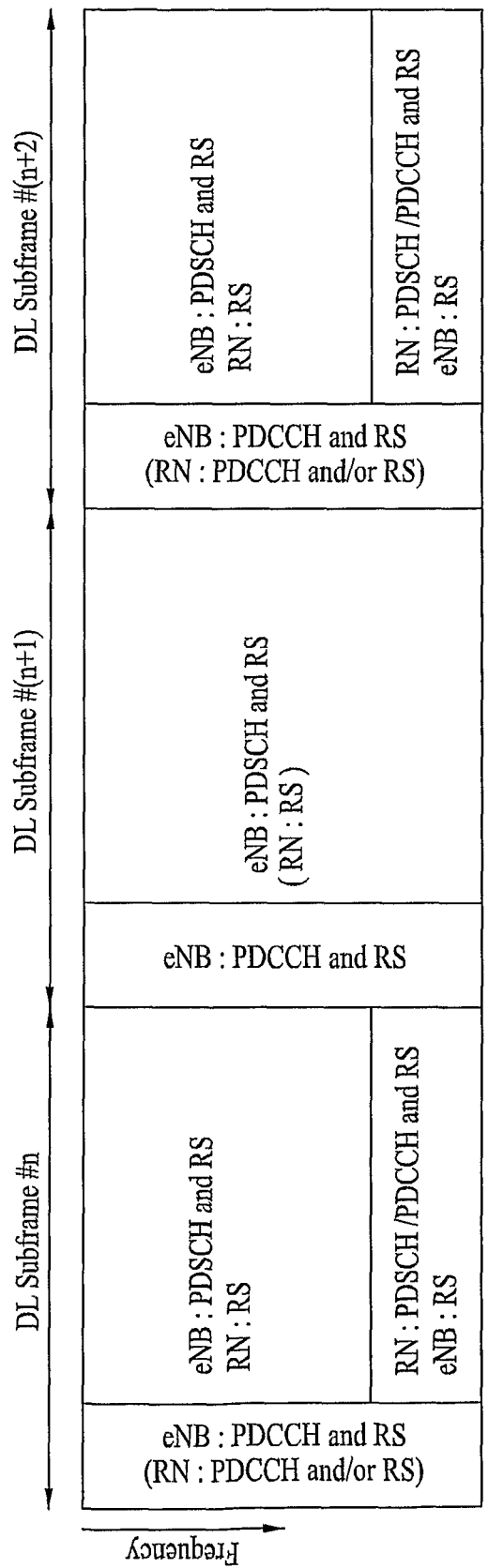
FIG. 4 illustrates an exemplary case where both an eNB and an RN transmit their Reference Signals (RSs) across a total frequency band.
Figure 5:
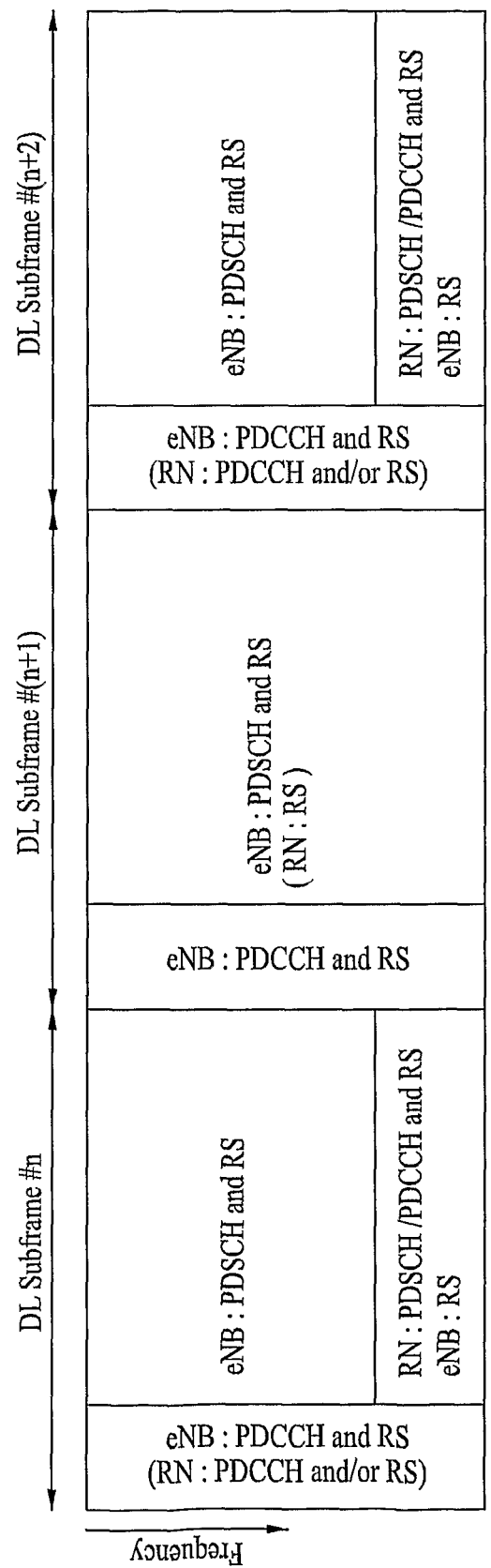
FIG. 5 illustrates an exemplary case where an eNB transmits its RSs across a total frequency band and an RN transmits its RSs only in a subband allocated to the RN for PDCCH and PDSCH transmission.
Figure 6:
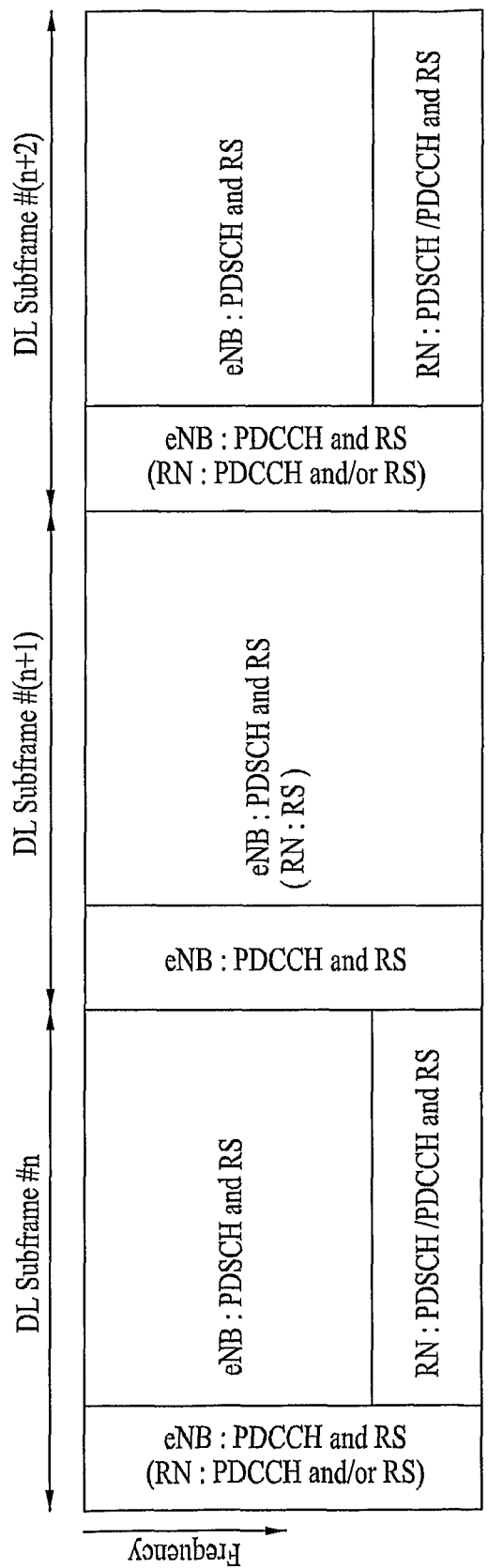
FIG. 6 illustrates an exemplary case where both an eNB and an RN transmit their RSs only in respective downlink transmission areas allocated to them.

Hereinafter, an RS transmission relationship between the eNB and the RN will be described with reference to FIGS. 4 to 6 as a scheme applicable to the L1, L2 or L3 RN in the case of the FD RN. The following drawings show the subframe structure from the point of view of the cell of the RN. An region after PDCCH transmission is a PDSCH region, in which are time division multiplexed in a subframe. When the eNB transmits the PDCCH in the entire band, the PDCCH region is the region in which the eNB transmits control information, and may also be the region in which the RN may transmit the RSs and the PDCCH according to the design of the RSs of the RN and the kind of the RN. If the RN should receive the control and data information in PDCCH region transmitted by the eNB, the RN cannot transmit its control and RSs in the PDCCH region. However, when the RN may not receive the control and data information in PDCCH region, the RN may transmit its PDCCH and RSs in the PDCCH region. In order to support the existing LTE UE, the RN should transmit the PDCCH and RSs in the PDCCH region in FIG. 1. The schemes shown in FIGS. 4 to 6 are the schemes in which the eNB and the RN share the PDSCH region by a FDM scheme. In different sub-bands of the PDSCH, the eNB and RN transmit their own PDSCH accordingly.

FIG. 4 is a view showing an example in which both the eNB and the RN transmit the RSs in the entire band of the PDSCH region. In this case, since the eNB and the RN can know the channel information of the entire band, handover between the RNs and between the eNB and the RN is easily performed FIG. 5 is a view showing an example in which the eNB transmits the RSs in the entire band but the RN transmits the RSs only in its Physical Downlink Control Channel (PDCCH) and Physical Downlink Shared Channel (PDSCH) transmission allocation subbands. FIG. 6 is a view showing an example in which both the eNB and the RN transmit the RSs in the entire band in PDCCH region. However, they transmit their RS in their own downlink signal transmission allocation regions only.

As shown in FIGS. 4 and 5, if both the eNB and the RN transmit the RSs in the region in which the RN transmits data and both the RN and the eNB transmit the common-RSs.

Alternatively, as shown in FIG. 4, if subframes are divided into a subframe in which both the RN and the eNB transmit the signals using the FDM scheme and another subframe in which only the eNB transmits the signals (the subframe in which the RN receives the signals) and the RN and the eNB transmit the common-RSs.

In contrast, as shown in FIG. 5, if the eNB transmits the RSs in the entire band but the RN transmits the RSs only in the allocated frequency band, the eNB transmits the RSs for all the antenna ports in subbands in which the eNB transmits the signals, and the eNB transmits the RSs for some of the antenna ports in subbands allocated to transmit the signal of the RN. In this case, the RN may transmit the RSs for the antenna ports of the RN using the RS resources for the remaining antenna ports of the eNB.

As shown in FIG. 6, if the RN and the eNB are frequency-division-multiplexed in one subframe and RS transmission regions are also frequency-division-multiplexed, the eNB transmits the RSs for all the antenna ports in a region allocated to the eNB and the RN transmits the RSs for all the antenna ports. In FIG. 6, since the RS signal transmission regions of the eNB and the RN are different from each other according to the PDCCH and the PDSCH, these regions need to be signaled to the UE.

In FIG. 4, the subframe in which the RN and the eNB transmit the signal using the FDM scheme should be reported to all UEs by signaling, and the frequency of the subframe is determined according to the number of UEs which receive the service from the RN and the amount of data. If the period of the subframe is significantly long, that is, if a time from a subframe to a next subframe, in both of which the eNB and the RN are frequency-division-multiplexed, is significantly long, separate RSs are necessary. If the RN needs to perform channel measurement in the subframe in which the eNB transmits the PDSCH in the entire band, the wideband RS transmission of the RN should be allowed.

In this case, it should be allowed to set the transmission period of the wideband RSs of the RN and the period in which the eNB and the RN are frequency-division-multiplexed differently from each other, and signaling thereof should be defined. At this time, when the RN transmits the RSs in the subframe in which the eNB transmits the PDSCH in the entire band, the RN may transmit the RSs for the antenna ports of the RN using some RSs designed for the antenna ports of the eNB.

Meanwhile, it is preferable that the RN does not transmit any signal in the resource element region in which the eNB actually transmits the RSs and transmits a signal indicating that no signal is transmitted to UEs which receive services from the RN.

Third, a wired link between the RN and the eNB is considered. In this case, since information transmission between the RN and the eNB uses separate radio resources, the eNB and the RN may appear to be one component. At this time, channel information of the link between the RN and the R-UE is necessary. The RN may transmit its unique RSs, but may not transmit its unique PDCCH. That is, it is assumed that a transmission delay does not substantially occur between the eNB and the RN. In this case, every UE decodes the PDCCH generated by the eNB so as to obtain its control information. The RN needs to transmit only its RSs without transmitting the PDCCH or transmit its RSs while relaying the PDCCH generated by the eNB.

At this time, it is preferable that the RN does not transmit any signal in a region in which the eNB transmits RSs. In this case, RSs for data demodulation should be in the format of dedicated RSs, and a plurality of dedicated RSs should be defined according to the number of antenna ports of the RN. In addition, the dedicated RSs need to be signaled using the plurality of virtual antenna ports. In addition, wideband RSs for measurement should be transmitted without damaging the existing structure. At this time, a scheme for using null-CCE of a PDCCH region, a scheme for transmitting RSs using one OFDM symbol in one subframe or the like may be used.

Hereinafter, the case where a TD RN is used in an L2 or lower RN will be described. If the TD RN is used in the L2 or lower RN, since the eNB and the RN have the same cell ID, subframes are divided into a subframe in which the RN transmits signals and a subframe in which the eNB transmits signals. In the following description, a subframe in which the RN should receive signals from the eNB is not considered. The subframe structure in which the eNB and the RN transmit the signals may be largely divided into two modes. The eNB transmits its RSs and PDCCH in every subframe.

Generally, the RN does not need to receive the RSs and the PDCCH of the eNB in the subframe in which the RN transmits data, but may receive the RSs and the PDCCH of the eNB in every subframe according to the kind and the function of the RN (L1 or L2 wired RN). If the signals of the eNB do not need to be received in the subframe in which the RN transmits the signals, the RN may transmit its RSs and PDCCH in the PDCCH region.

The scheme for transmitting the signals in the PDSCH region may be performed according to signaling and a predetermined method. Alternatively, a scheme for dividing subframes into a subframe dedicated to the RN and a subframe dedicated to the eNB or a scheme for classifying subframes into an LTE subframe and an LTE-A subframe may be used. In the former scheme, an LTE UE may perform an operation such as measurement in all subframes. That is, an MBSFN operation may be performed in an LTE system. In the latter scheme, the LTE UE is disabled to receive a service in a specific subframe.

First, the RS and PDCCH transmission structure of the eNB in the former scheme will be described. The eNB transmits the RSs and the PDCCH in every subframe of the PDCCH region. All the UEs which receive the service from the eNB may receive and demodulate these signals and perform an operation such as measurement using the signals. The eNB may transmit the RSs of the PDCCH and the PDCCH in the subframe allocated to the RN while transmitting the PDCCH and the PDSCH in a specific subframe allocated for transmission of its signals. However, no signal including RSs may be transmitted in the PDSCH region. That is, the UE which directly receives the service from the eNB may receive the signals of the eNB in all the subframes, but it is necessary for the UE not to measure and receive the RSs in the data region of the subframe allocated to the RN.

In contrast, the subframe structure may be designed such that the eNB does not transmit any signal in the subframe allocated to the RN. In this case, when the RN transmits the signals in the given subframe, the RN may transmit the signals without being restricted by the structure of the signals transmitted by the eNB. At this time, if the RN is the L2 RN, the RN may generate a unique PDCCH and transmit signals in the format similar to the existing LTE system.

In the latter scheme, entire subframes are not temporally divided from the point of view of the eNB and the RN, but are temporally divided into subframes for supporting the LTE system and the LTE-A system. The signaling of the subframes may be performed similar to the signaling of the subframes of the RN. That is, the subframes are divided into a subframe in which an LTE UE receives a service from the eNB and a subframe in which an LTE-A UE receives a service from the eNB or the RN, and are signaled to the UE periodically or with a specific pattern. Such a scheme for dividing the subframes may be free from the restraint that the RN should support the LTE UE. This is because the LTE-A UE is newly designed so as to recognize the RN and the RN provides a service only in a subframe defined as the LTE-A subframe.

Figure 7:
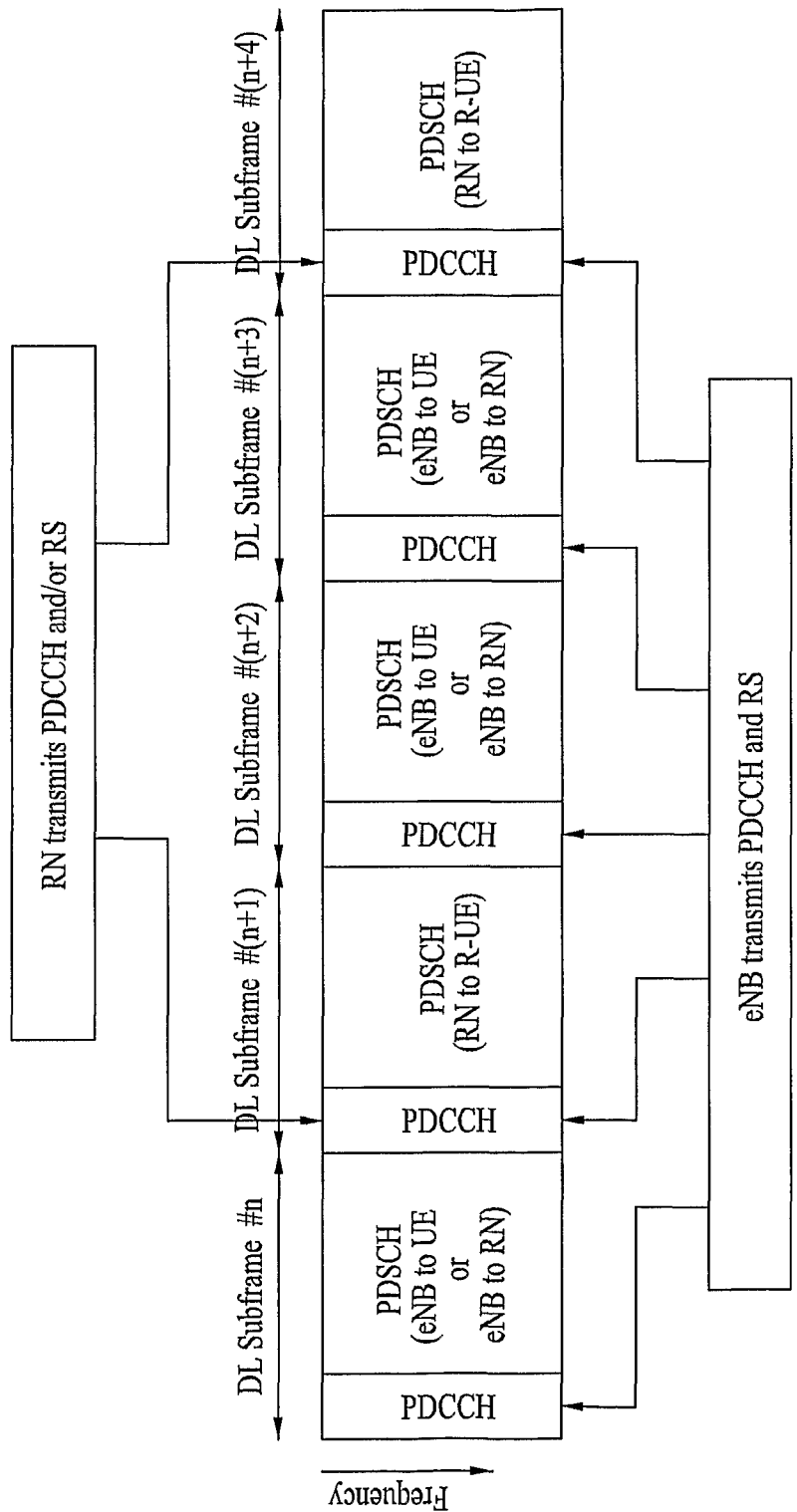
FIGS. 7 and 8 illustrate relationships between an eNB and an RN in RS and control information transmission, when the RN is a TD-RN.
Figure 8:
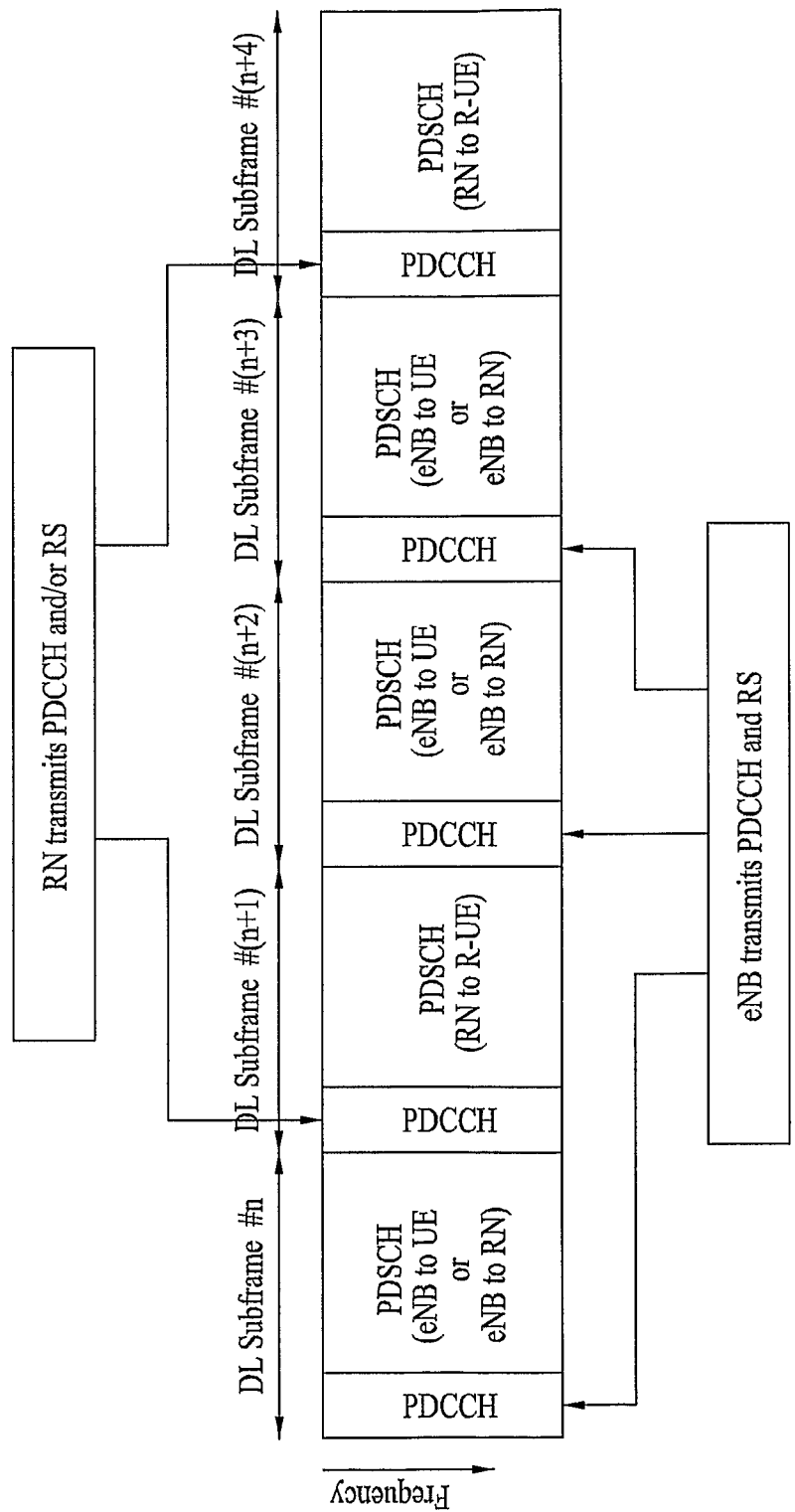

FIGS. 7 and 8 are views showing a relationship of RS transmission and control information transmission between an eNB and an RN when a TD RN is used.

FIG. 7 shows a scheme in which the RN and the eNB transmit signals using the TDM scheme and the eNB may transmit a minimum amount of signals even in the subframe of the RN. In this case, the eNB transmits the PDCCH and the RSs in all subframes, but the RN transmits the PDCCH and the RSs only in the subframe allocated to the RN. The RN should transmit the PDCCH and the wideband RS only in the subframe allocated to the RN without colliding with the PDCCH and the RS transmitted by the eNB and thus a design therefor is necessary. The RN may transmit the common-RSs in the subframe allocated thereto of the PDSCH region using the same scheme as the RS transmission scheme for the antenna ports of the eNB. The RN and the eNB transmit the common-RSs in different subframes while sharing the same RS sequence. The RS sequence is shared in the same subframe, but an entity for transmitting the RSs in the PDCCH region and an entity for transmitting the RSs in the PDSCH region are different from each other.

In FIG. 8, the RN and the eNB transmit the signals using the TDM scheme and the eNB does not transmit any signal in the subframe allocated to the RN, unlike FIG. 7. In this case, the RN may use the PDCCH and RS structure of the existing RN without change. The RN and the eNB transmit the common-RSs in different subframes while sharing the same RS sequence.

If the period of the subframe in which the RN transmits the signals is significantly long, that is, if a time from a subframe to a next subframe, in both of which the eNB and the RN are frequency-division-multiplexed, is significantly long, separate RSs are necessary. If the RN needs to perform channel measurement in the subframe in which the eNB transmits the PDSCH in the entire band, the wideband RS transmission of the RN should be allowed. At this time, when the RN transmits the RSs in the subframe allocated to transmit the PDSCH by the eNB, the RN may use some RSs designed for the antenna ports of the eNB for transmitting the RSs for the antenna ports of the RN.

The following schemes are applicable to an L2 RN, in which the RN generates its RN-specific PDCCH and transmits downlink control information on the RN-specific PDCCH. When the eNB transmits downlink signals, it may transmit a PDCCH and a PDSCH using an RN ID to the RN by treating the RN as a UE, as it uses a UE ID in transmitting a PDCCH and a PDSCH to a UE, in the same link and manner as used for UEs. Upon receipt of the PDCCH from the eNB, the RN may find out a downlink data area allocated to it by decoding the PDCCH. The RN may acquire information about control and data for UEs to be serviced by the RN from the decoded PDCCH. The RN receives control information and data from the eNB using the information, decodes them, and services them to the UEs after a predetermined number of subframes. The RN may transmit an RN-specific PDCCH by re-configuring the control information for the UEs.

Because the RN receives control information about its downlink data from the eNB in advance, it may estimate the amount of downlink data that the RN is supposed to transmit to the UEs. If determining based on the received control information that a resource area allocated to the RN is insufficient, the RN may request resources to the eNB in advance. If determining based on the received control information that the resource area allocated to the RN is excessive, the RN may return extra resources to the eNB by signaling. It is preferred in terms of stable operations of the RN that the resource request and return is semi-static.

Now a description will be made of a scheme in which the RN starts downlink transmission when the eNB completes PDCCH transmission in order to avoid overlap between a PDCCH area of the eNB and a downlink transmission area of the RN.

This scheme is applied in the case where the eNB also transmits a signal even in a subframe allocated to the RN, if the RN is a TD-RN. That is, this scheme is required when classifying a subframe between the RN and the eNB is signaled in a similar manner with MBSFN.

Figure 9:
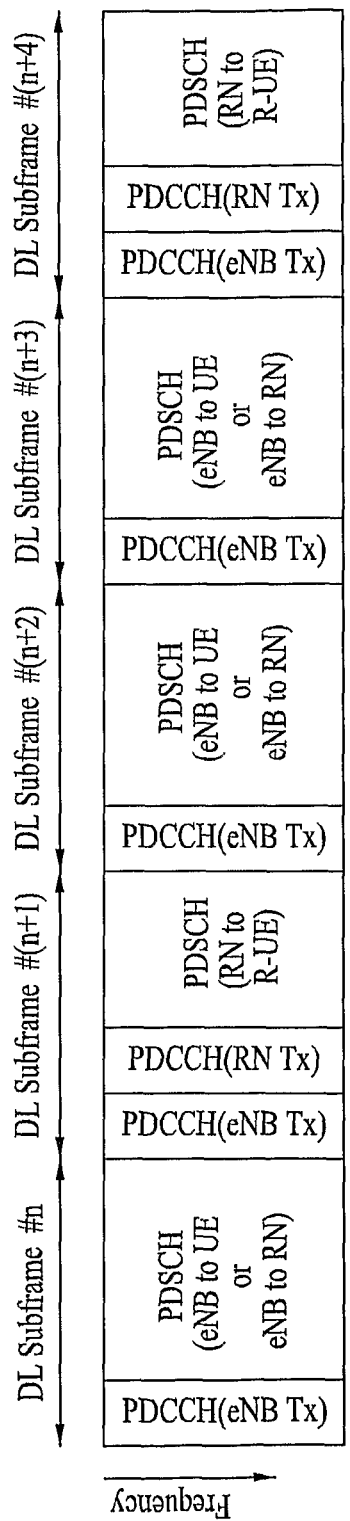
FIG. 9 illustrates a method for transmitting a control channel of a TD-RN according to an exemplary embodiment of the present invention.

FIG. 9 illustrates a method for transmitting an RN-specific control channel in a TD-RN according to an exemplary embodiment of the present invention.

Referring to FIG. 9, the eNB should transmit RSs and other signals even in an MBSFN subframe. Hence, the eNB may transmit a signal in a few symbols of a subframe allocated to the RN. The RN transmits a downlink signal after the eNB completes its signal transmission.

Figure 10:
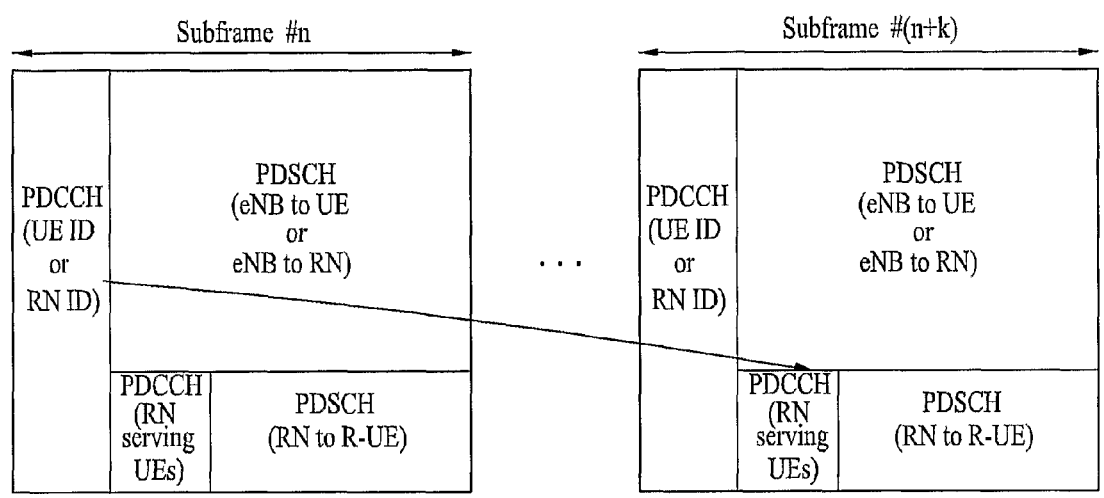
FIG. 10 illustrates a method for transmitting a control channel of an FD-RN according to an exemplary embodiment of the present invention.

FIG. 10 illustrates a method for transmitting an RN-specific control channel in an FD-RN according to an exemplary embodiment of the present invention.

Referring to FIG. 10, the FD-RN transmits its downlink signal after the eNB completes its PDCCH transmission in a subframe. That is, after the eNB transmits a PDCCH across a total frequency band, the RN starts to transmit a downlink signal in a frequency band allocated to it. In the frequency band, the RN transmits its PDCCH and PDSCH.

Some time is taken for the RN to generate and transmit the RN-specific PDCCH after receiving and decoding the PDCCH from the eNB. Therefore, PDCCH information received in a current subframe at the RN is information about data to be transmitted a predetermined number of subframes later.

To support the foregoing scheme in the system, the RN and UEs should have knowledge of the start time of downlink transmission from the RN (the start time of the RN-specific PDCCH from the RN), that is, the end time of PDCCH transmission from the eNB (the number of OFDM symbols used for the PDCCH transmission of the eNB), so that the UEs should be able to receive information from the RN accurately. In an exemplary embodiment of the present invention, the RN-specific PDCCH transmission of the RN starts when the PDCCH transmission of the eNB ends. However, information about the number of OFDM symbols occupied for the PDCCH transmission of the eNB is transmitted on a Physical Control Format Indicator CHannel (PCFICH), and the information varies in every subframe.

Therefore, a UE may determine the time of downlink transmission of the RN in two methods. One is blind detection and the other is to use information pre-defined by the system. In the latter method, the number of symbols occupied for PDCCH transmission in a subframe in which the eNB and the RN transmit signals simultaneously is predetermined and notified to the RN and the UE.

The eNB transmits a PDCCH using an RN ID to the RN, treating the RN as a UE. After a predetermined number of subframes, the RN generates a PDCCH and a PDSCH for R-UEs using the PDCCH and PDSCH received from the eNB. The RN may shift the timing of a subframe, for transmission. For instance, it may be signaled that the data reception timing of the R-UEs is shifted by n symbols and no signal is transmitted in the last n symbols of the subframe. In this case, the R-UEs need to receive and demodulate data without receiving the last n symbols.

Preferably, a frequency region in which the RN transmits control information is limited to a region allowed for the RN to transmit control information and data on the downlink. A time-frequency area allocated to the RN is defined in a PDSCH area of the eNB. The time-frequency area of the RN may be signaled dynamically or statically by higher signaling. The RN may transmit RSs in the same manner as a TD-RN does.

Herein, the RN and the eNB transmit PDCCHs at the same timing. That is, the eNB and the RN operate in FDM in a PDCCH area as well as in a PDSCH area in a given frequency band. The eNB transmits the PDCCH only in its downlink transmission band, not across the total frequency band.

Figure 11:
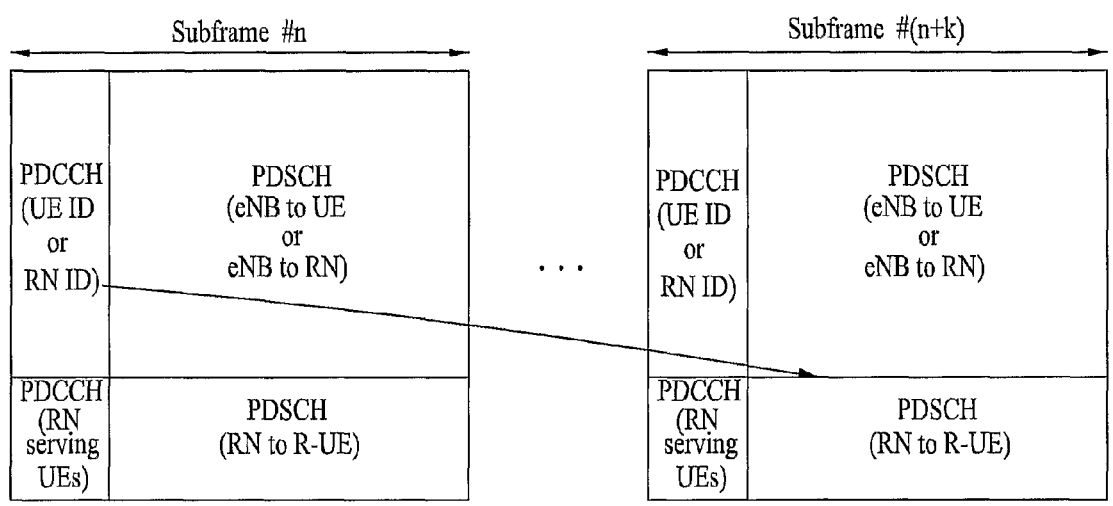
FIG. 11 illustrates a method for transmitting a control channel of an FD-RN according to another exemplary embodiment of the present invention.

FIG. 11 illustrates a method for an RN-specific control channel in an FD-RN according to another exemplary embodiment of the present invention.

Referring to FIG. 11, the eNB and the RN use different frequency bands in data and control areas. The eNB generates and transmits a PDCCH using an RN ID to the RN in a subframe. The RN decodes the PDCCH and receives and decodes a PDSCH using the decoded PDCCH in the subframe. After a predetermined number of subframes, the RN generates a new PDCCH, i.e. an RN-specific PDCCH using the decoded PDCCH and transmits the new PDCCH to R-UEs. The frequency bands of the RN-specific PDCCH and the PDSCH transmitted from the RN are different from those of downlink transmission from the eNB.

It may be considered that the transmission areas of the eNB and the RN are logically separated in the scheme illustrated in FIG. 11. To be specific, both the eNB and the RN may transmit PDCCHs across the total frequency band. The eNB distributes successive control information received from a higher layer to the total frequency band using an interleaver to achieve a diversity gain in frequency. The interleaver may be shared between the eNB and the RN. That is, a predetermined area of the entire interleaver may be reserved for the RN.

Similarly, the eNB and the RN may share basic units of control information before the control information is input to the interleaver. In LTE, a PDCCH is composed of CCEs. According to the amount of control information, the PDCCH may include 1, 2, 4 or 8 CCEs. Part of the CCEs of the PDCCH, which is interleaved and then mapped to a physical frequency, may be reserved for the RN. Given N CCEs for a PDCCH, the RN reserves a predetermined number of CCEs for transmission of an RN-specific PDCCH and transmits the RN-specific PDCCH in the reserved CCEs. Then R-UEs may receive the RN-specific PDCCH by decoding CCE indexes of a predetermined area. Therefore, the eNB and the RN may transmit their PDCCHs across the total frequency band without separating their PDCCH areas physically. In this case, the RN should also transmit RSs so that the R-UEs receive a PDCCH from the RN. For this purpose, null-CCEs may be used.

Technologies for supporting up to 100 MHz have been proposed for the LTE-A system. A contiguous 100 MHz is physically difficult to acquire. Hence, a downlink service is supported by collecting physically spaced frequency bands to 100 MHz. This concept is called carrier aggregation. When carrier aggregation is introduced for an RN, a consideration should be given to the case where a frequency band used by the RN is separated from a frequency band in which an existing eNB services UEs. An out-of-band RN uses a different carrier frequency from an existing carrier frequency band, for downlink transmission. This case may be considered in the scheme illustrated in FIG. 11. Herein, the eNB and the RN may change transmission frequency bands dynamically or statically according to the amounts of data to be transmitted to UEs and R-UEs.

Unlike the above scheme, a PDCCH transmission band and a PDSCH transmission band may be configured to be different.

Figure 12:
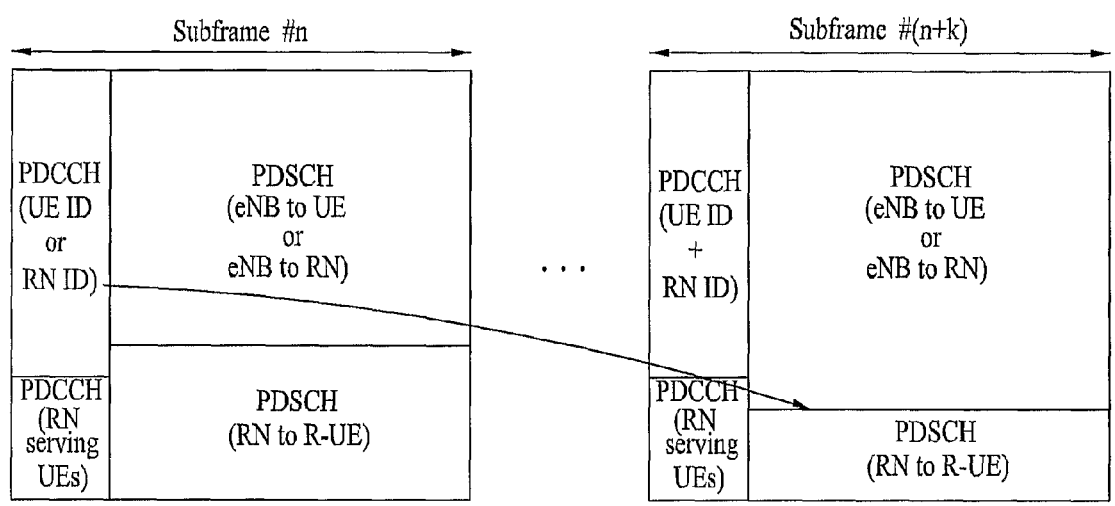
FIG. 12 illustrates a method for transmitting a control channel of an FD-RN according to a further exemplary embodiment of the present invention.

FIG. 12 illustrates a method for transmitting an RN-specific control channel in an FD-RN according to another exemplary embodiment of the present invention.

Referring to FIG. 12, a UE should have knowledge of an accurate frequency band carrying a PDCCH to receive the PDCCH. Because the PDCCH is transmitted across a total frequency band, the UE needs to decode the PDCCH across the total frequency band. Therefore, the transmission frequency band of the PDCCH should not be changed. In contrast, a PDSCH area does not need to be fixed in every subframe because the eNB allocates a variable amount of resources to the UE according to the amount of data for the UE and the channel status of the UE. Accordingly, it is preferred that PDCCH areas (frequency bands) of the eNB and the RN are fixed and a PDSCH area of the RN is variable in size. Thus, the eNB may allocate resources dynamically according to the amount of data to be relayed, for use in downlink data transmission of the RN. While the RN transmits an RN-specific PDCCH to an R-UE in a fixed frequency band, it transmits data to the R-UE in dynamically allocated resources, thereby effectively using radio resources.

In this case, both the eNB and the RN transmit common RSs only in their PDCCH areas. During PDSCH transmission, dedicated RSs need to be transmitted for data demodulation.

Meanwhile, in FIG. 12, an LTE UE may receive a PDSCH and a PDCCH which have the same transmission band. However, a newly designed LTE-A UE may receive a PDSCH and a PDCCH which have different transmission bands.

Figure 13:
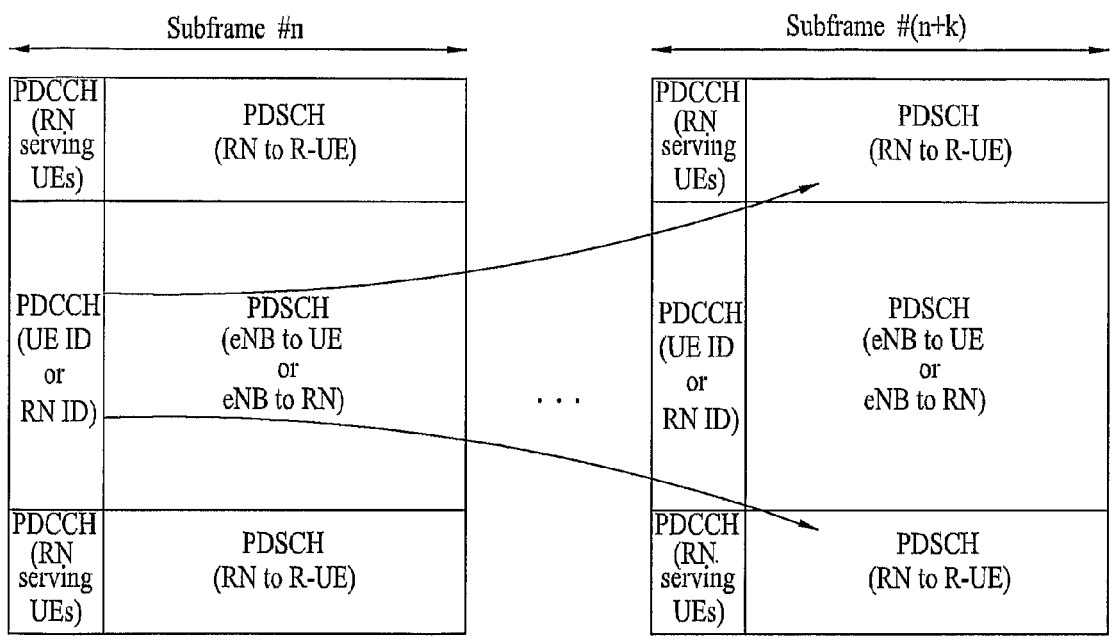
FIG. 13 illustrates an exemplary case where three RNs each transmit RSs for two antennas simultaneously.

FIG. 13 illustrates a method for transmitting an RN-specific control channel in an FD-RN according to a further exemplary embodiment of the present invention.

Referring to FIG. 13, while the eNB transmits a PDCCH across the total frequency band, the RN may transmit an RN-specific PDCCH in a plurality of frequency bands. For example, the eNB may transmit the PDCCH in a successive band with a carrier frequency as a central frequency and the RN may transmit the RN-specific PDCCH over a plurality of bands.

In the illustrated case of FIG. 13, PDSCH areas of the RN may be placed in both end frequency bands. Then PDCCH formats need to be changed for UEs. An LTE UE may receive only a PDSCH in one of the two end frequency bands and a newly designed LTE-A UE may receive PDSCHs in the two end frequency bands.

In the present invention, RNs include a relay node, a relay station, a repeater, etc. Also, the RNs may include a remote radio element connected to an eNB.

The above described embodiment is not limited to the eNB and the relay node. Rather, the above described embodiments may be applied to a Macro eNB (MeNB) and a Home eNB (HeNB). The MeNB and the HeNB can correspond to the eNB and the relay node, respectively.

The MeNB has a large coverage, a high transmission power and an open network. On the other hand, the HeNB has a small coverage, a low transmission power and a closed network (i.e., closed subcarrier group). The HeNB can be relay node (L3 relay node).

MODE FOR INVENTION

Various embodiments have been described in the best mode for carrying out the invention.

INDUSTRIAL APPLICABILITY

The present invention pertains to a communication technology using RNs for complementing or improving an area where a service from an eNB is not sufficient or impossible. The present invention is applicable to systems including a 3GPP LTE system, a 3GPP LTE-A system, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting a downlink signal in a Frequency Division (FD) type relay node (RN), the method comprising:
    transmitting, by the RN, a downlink control channel specific to the RN ("RN DL control channel") in a first subband of a control region of a downlink subframe, the control region being divided into the first subband for the RN DL control channel and a second subband for a downlink control channel specific to an eNB ("eNB DL control channel"), the RN DL control channel being simultaneously transmitted with the eNB DL control channel; and
    transmitting, by the RN, a downlink shared channel including data of the RN ("RN DL shared channel") in a first subband of a data region of the downlink subframe, the data region being divided into the first subband for the RN DL shared channel and a second subband for a downlink shared channel including data of the eNB ("eNB DL shared channel"), the RN DL shared channel being simultaneously transmitted with the eNB DL shared channel,
    wherein bandwidths of the RN DL shared channel and the eNB DL shared channel are variable in each subframe according to channel state, and
    wherein the method further comprises transmitting a reference signal (RS) dedicated to the RN in the first subband of the data region.

2. The method according to claim 1, wherein the eNB DL control channel includes information about an RN DL shared channel to be transmitted after a predetermined number of downlink subframes.

3. The method according to claim 1, further comprising determining whether or not to transmit the RS dedicated to the RN in the second subband of the data region.

4. The method according to claim 3, wherein, if the RS dedicated to the RN is transmitted in the second subband of the data region, the RS is transmitted using a part of radio resources that are configured for and not used for an RS dedicated to the eNB.

5. The method according to claim 3, wherein the RS transmitted in the second subband of the data region is used to measure wideband-channel.

6. The method according to claim 1, wherein, if an RS dedicated to the eNB is transmitted in the first subband of the data region, the RS dedicated to the RN is transmitted in a part of radio resources that are configured for and not used for an RS dedicated to the eNB.

7. A method for transmitting a downlink signal in a Frequency Division (FD) type relay node (RN), the method comprising:
    transmitting, by the RN, a downlink control channel specific to a the RN ("RN DL control channel") in a first subband of a data region of a downlink subframe, the data region being divided into the first subband and a second subband for a downlink shared channel specific to an eNB ("eNB DL shared channel"); and
    transmitting a downlink shared channel including data of the RN ("RN DL shared channel") in the first subband of the data region of the downlink subframe, the RN DL control channel being transmitted through the whole frequency band of the first subband,
    wherein bandwidths of the RN DL shared channel and the eNB DL shared channel are variable in each subframe according to channel state, and
    wherein the method further comprises transmitting a reference signal (RS) dedicated to the RN in the first subband of the data region.

8. The method according to claim 7, further comprising determining whether or not to transmit the RS dedicated to the RN in the second subband of the data region.

9. The method according to claim 8, wherein, if the RS dedicated to the RN is transmitted in the second subband of the data region, the RS is transmitted using a part of radio resources that are configured for and not used for an RS dedicated to the eNB.

10. The method according to claim 8, wherein the RS transmitted in the second subband of the data region is used to measure wideband-channel.

11. The method according to claim 7, wherein, if an RS dedicated to the eNB is transmitted in the first subband of the data region, the RS dedicated to the RN is transmitted in a part of radio resources that are configured for and not used for an RS dedicated to the eNB.

* * * * *